Patented Feb. 23, 1954

2,670,378

UNITED STATES PATENT OFFICE 2,670,378

METHOD FOR CONVERTING OXYGENATED ORGANIC CHEMICALS IN HYDROCARBON SYNTHESIS

Clifton G. Frye, Tulsa, Okla., assignor to Stanolind Oil and Gas Company, Tulsa, Okla., a corporation of Delaware No Drawing. Application March 12, 1951,
Serial No. 215,190

9 Claims. (Cl. 260—596)

The present invention relates to a novel method for altering the concentration of certain oxygenated organic compounds present in aqueous or anhydrous mixtures thereof. A particular embodiment thereof pertains to a method whereby the relative proportions of alcohols and carbonyl compounds produced during the synthesis of hydrocarbons from carbon monoxide and hydrogen can be voluntarily controlled.

In the synthesis of hydrocarbons from carbon monoxide and hydrogen, there are simultaneously produced several classes of oxygenated organic compounds such as, for example, alcohols, aldehydes, ketones, esters, acids, etc., which vary considerably in value. Generally speaking, the carbonyl compounds, i. e., the ketones and aldehydes, are less in demand than the alcohols and acids produced in the aforesaid synthesis. However, a very substantial percentage of the oxygenated organic compounds produced during hydrocarbon synthesis consists of carbonyl compounds; and, generally, in order to improve the over-all economics of the process, additional markets must be found in a field which is already highly competitive or else such compounds must be converted into products of greater value. The reduction of carbonyl compounds with molecular hydrogen over platinum, nickel or similar hydrogenation catalysts under relatively mild conditions is well known. However, to employ catalysts of this type for effecting conversion to alcohols of the 140,000–150,000 lbs. per day of carbonyl compounds calculated to be produced by commercial-scale hydrocarbon synthesis plants would render such conversion less desirable.

Accordingly, it is an object of my invention to provide a method by which the aforesaid carbonyl fraction can be readily and efficiently converted into the corresponding alcohols. It is a further object of my invention to accomplish this result by first isolating said carbonyl fraction from the associated products produced during hydrocarbon synthesis and returning said fraction to the synthesis reactor in a manner such that the carbonyl compounds are converted to their corresponding alcohols without interfering with hydrocarbon synthesis or without substantial reduction in the quantity of carbonyls available for conversion to alcohols. It is a still further object of my invention to provide a process whereby the concentration of one or more components in a carbonyl or in an alcohol fraction may be varied at will. It is a further object of my invention to provide a method whereby relatively high yields of total chemicals are obtained during hydrocarbon synthesis while at the same time producing only those chemicals desired.

In general, the process of my invention is based on the discovery that under normal hydrocarbon synthesis conditions the reactions involved in the reduction of the aforesaid carbonyl compounds to their corresponding alcohols are in equilibrium. The reactions forming the basis of such equilibrium occur at a rapid rate compared to those involved in the synthesis of hydrocarbons. In carrying out my invention, synthesis gas is introduced into the reactor in the normal fashion where it contacts a fluid bed of iron hydrocarbon synthesis catalyst; and synthesis of hydrocarbons, both liquid and gaseous, is effected. The oil and/or water soluble carbonyl fractions produced are isolated from the balance of the synthesis products and introduced into the reactor at a lever above the point of entry of the feed and the recycle gas. In the majority of instances, it is generally preferable to inject the aforesaid carbonyl fraction above the zone in which principal conversion of carbon monoxide to hydrocarbons occurs, this zone usually being the lower or the first one-third of the catalyst bed. By introducing the carbonyl compounds into the reactor in this manner rather than directly into the recycle gas stream, optimum contact of such compounds with the catalyst bed is afforded to secure good conversion thereof to alcohols. Thus, during this relatively short interval of contact of said carbonyl compounds with the catalyst, only a relatively small amount of the carbonyls is converted to olefins and saturated hydrocarbons. Whereas, if the aforesaid carbonyl fraction were returned directly to the feed or recycle gas stream the contact time thereof with the catalyst would be considerably increased, resulting in an increase in the above-mentioned undesirable secondary reactions and a corresponding loss in the quantity of desired oxygenated products.

In carrying out the process of my invention, I may employ reaction conditions previously considered suitable such as, for example, synthesis gas (fresh feed) consisting of 95–98 per cent carbon monoxide and hydrogen in a hydrogen to carbon monoxide ratio of from 1.5:1 to 2.0:1, temperatures of between 600° to 700° F., pressures of 325 to 425 p. s. i. g. and recycle ratios of from about 1.2 to about 1.7 volumes of recycle gas per volume of fresh feed. While the operating conditions set forth above are those which I consider preferable, it is to be strictly understood that the process of my invention is capable of producing advantageous results when employing any of a number of known synthesis conditions or various combinations thereof.

Catalysts suitable for effecting the foregoing results may be selected from a relatively large number of known iron hydrocarbon synthesis catalysts. Catalysts of this type containing high percentages of silica generally are undesirable for my purposes inasmuch as the reactions involved herein are not found to be at equilibrium under normal synthesis conditions. Thus, iron catalysts containing as much as 10 to 12 weight per cent silica are not capable of effecting this conversion to the desired extent under the above stated conditions, although catalysts substantially free from silica, i. e., those having a silica content of not more than 1 or 2 weight per cent, are satisfactory. In general, however, I prefer to use a catalyst commonly designated as mill scale, which is described and claimed in U. S. 2,485,945 to S. W. Walker. This catalyst is prepared from the oxide scale or layer obtained by rolling iron or various alloys thereof at elevated temperatures, for example, in the range of 1000° to 1300° C. Microscopic examination of the scale or oxide layer thus obtained when ground to a fineness of 325 mesh indicates that it still retains its characteristic plate-like structure.

The rate at which the carbonyl fraction is introduced into the reactor should be such that the linear velocity of the gas above the point of introduction of said fraction is insufficient to cause a noticeable increase in catalyst entrainment by the exit gas. Generally, the rate of introducing this fraction into the reactor may be as much as 20 weight per cent of the carbon monoxide in the feed. The carbonyl stream may be either in liquid or vapor form when introduced in the reaction zone as herein set forth. However, if liquid feed is employed at this point, it should not be cooled to such an extent that its addition results in a suppression of the principal hydrocarbon synthesis reaction.

While the present description emphasizes the application of the discovery forming the basis of my invention to the conversion of carbonyl compounds to alcohols, it will, of course, be appreciated that alcohols may be converted with equal ease to ketones and aldehydes and that under certain market conditions it may be regarded desirable to conduct the process of my invention in such a manner. Thus, the conditions herein defined for introducing and converting a carbonyl stream to alcohols also apply with equal force when it is desired to effect the reverse of this reaction.

The carbonyl or alcohol fraction, whichever it may be desired to convert, can be recovered from the remaining hydrocarbon synthesis products in accordance with a number of procedures outside the scope of my invention, some of which are known to the art. Ordinarily, I prefer to accomplish this object in the manner set forth by the combined teachings of Michael copending applications S. N. 748,295 and S. N. 775,919, (now U. S. Patent No. 2,625,560) filed May 15, 1947, and September 24, 1947, respectively. By the process taught in copending S. N. 748,295, water soluble carbonyls and alcohols may be separated from the remainder of the water soluble chemicals contained in the primary water stream from hydrocarbon synthesis by first subjecting said stream to distillation under carefully controlled conditions to effect a separation between the acid and nonacid components thereof. The nonacid component, which consists essentially of carbonyls and alcohols, is thereafter further fractionally distilled to separate the water soluble carbonyls from the alcohols. Oil soluble carbonyls and alcohols are recovered from the acid-free hydrocarbon synthesis oil in accordance with the procedure described in copending application S. N. 775,919 involving extraction of said oil with an aqueous bisulfite solution. The resulting aqueous extract which contains the oil soluble carbonyls and alcohols is next countercurrently extracted with a light hydrocarbon, such as pentane, which selectively extracts the alcohols, leaving a raffinate of carbonyls in the form of their bisulfite addition products. Thereafter, the pentane extract is distilled to recover the alcohols as bottoms while the aforesaid raffinate is treated in a known manner to liberate and recover the carbonyl compounds.

The process of my invention is further illustrated by the specific example which follows:

EXAMPLE

A hydrocarbon synthesis gas mixture containing 95 mol per cent hydrogen and carbon monoxide in a hydrogen-to-carbon monoxide ratio of 1.85 to 1.90 is reacted at a temperature of about 600° F. and at a pressure of 400 p. s. i. g. in a reactor 20 feet long and 8 inches I. D. containing a fluidized bed of reduced finely divided mill scale catalyst promoted with from about 0.5 to 0.7 weight per cent $K_2O$. Recycle ratios of 1.0 to 2.0 and a space velocity of 5.6 S. C. F. H.(CO)/lb. iron are employed. The foregoing conditions are maintained for approximately 700 hours. A second run is effected under the same conditions as those specified above with the exception that propionaldehyde is recovered from the primary water and returned to the reactor at a rate of 0.133 mol/109 mols of carbon monoxide fed. This stream of propionaldehyde is injected at a point approximately 2 feet below the top of the fluid catalyst bed which is 10 feet high. A third run is carried out under the same conditions as those employed in Run 2 with the exception that 1-propanol is recovered from the primary water and returned to the reactor at a rate of 0.32 mol/109 mols of carbon monoxide fed. Differences in the quantities of 1-propanol and propionaldehyde produced in the above-mentioned runs are indicated in the table appearing below:

Table

|  | Run 1 | Run 2 | Run 3 |
|---|---|---|---|
| Temperature (° F.) | 650 | 650 | 650 |
| Pressure (P. s. i. g.) | 400 | 400 | 400 |
| $H_2$:CO Ratio | 1.85–1.90 | 1.85–1.90 | 1.85–1.90 |
| Space Velocity [S. C. F. H. (CO)/lb. iron] | 5.60 | 5.60 | 5.60 |
| Percent Total Feed CO Conversion | 91.8 | 91.8 | 91.8 |
| Percent Product Carbon as Propanol | 1.10 | 1.44 | 1.92 |
| Percent Product Carbon as Propionaldehyde | 0.137 | 0.180 | 0.234 |
| Percent Loss of Recycled Chemicals |  | 4.3 | 4.5 |
| Percent Recycled Chemicals Converted to Alcohol |  | 85 |  |
| Percent Recycled Chemicals Converted to Propanol |  |  | 10.1 |
| Percent Increase in Propanol |  | 30.9 |  |
| Percent Increase in Propionaldehyde |  |  | 70.8 |

From the foregoing, it will be apparent that the process of the present invention provides a simple and economical method for producing as a net product from one reactor essentially the same amount of total chemicals while at the same time furnishing only those chemicals desired.

It is to be strictly understood that the foregoing example and other specific illustrative material contained herein are not in any way to be construed as limiting the scope of my invention. On the contrary, the process of the present invention is intended to cover the broad idea of introducing into the catalyst bed during hydrocarbon synthesis, at a point located above the feed gas inlet, a carbonyl or alcohol component and converting such component to the corresponding alcohol or carbonyl. While the process of my invention has been described with particular emphasis on the application thereof to fluid bed operation, the principles taught herein are equally applicable to fixed bed methods. Also, although I have described my invention as involving recycling to the reactor carbonyls or alcohols produced during hydrocarbon synthesis, it will be apparent that such procedure may be varied within the scope of said invention to include the injection of carbonyls or alcohols regardless of their source to thereby secure in a single operation both hydrocarbons and an increased quantity of the alcohol or carbonyl component, whichever is desired. The mixtures introduced into the reactor, i. e., carbonyls or alcohols, in accordance with my invention may be either anhydrous or aqueous and need not be highly purified with respect to other organic components normally associated therewith. Also, it is to be understood that the expression "carbonyl compound" appearing throughout the present disclosure and claims is intended to refer only to aldehydes and ketones.

What I claim is:

1. In a method of converting one of a class of compounds selected from the group consisting of carbonyl compounds and alcohols to alcohols and carbonyl compounds, respectively, in a generally vertically positioned hydrocarbon synthesis reaction zone wherein synthesis gas composed chiefly of carbon monoxide and hydrogen is passed upwardly through said zone and is partially converted to hydrocarbons under known synthesis conditions, the steps which comprise introducing into said reaction zone only at a point above the lower one third of said zone one of said classes of said compounds and contacting the latter with a finely divided active iron hydrocarbon synthesis catalyst substantially free from silica whereby a conversion to the other of said classes of said compounds is secured simultaneously with the formation of hydrocarbons.

2. In a method for converting one of a class of compounds selected from the group consisting of carbonyl compounds and alcohols to alcohols and carbonyl compounds, respectively, in a generally vertically positioned hydrocarbon synthesis reaction zone wherein synthesis gas composed chiefly of carbon monoxide and hydrogen is passed upwardly through said zone and is partially converted to hydrocarbons under known synthesis conditions, the steps which comprise introducing into said reaction zone only at a point above the lower one third of said zone one of said classes of said compounds and contacting the latter in said zone with a dense fluidized bed of an active iron hydrocarbon synthesis catalyst substantially free from silica whereby a conversion to the other of said classes of said compounds is secured simultaneously with the formation of hydrocarbons.

3. In a method for converting carbonyl compounds to alcohols in a generally vertically positioned hydrocarbon synthesis reaction zone wherein synthesis gas composed chiefly of carbon monoxide and hydrogen is passed upwardly through said zone and is partially converted to hydrocarbons under known synthesis conditions, the steps which comprise introducing a carbonyl compound into said reaction zone only at a point above the lower one third of said zone and contacting said carbonyl compound with a fluidized bed of active iron mill scale catalyst which has been ground and reduced whereby a conversion to the respective alcohol is secured simultaneously with the formation of hydrocarbons.

4. The process of claim 3 in which an aldehyde is employed as the carbonyl compound.

5. The process of claim 3 in which a ketone is employed as the carbonyl compound.

6. In a method for converting an alcohol to its corresponding carbonyl compound in a generally vertically positioned hydrocarbon synthesis reaction zone wherein synthesis gas composed chiefly of carbon monoxide and hydrogen is passed upwardly through said zone and is partially converted to hydrocarbons under known synthesis conditions, the steps which comprise introducing an alcohol into said reaction zone only at a point above the lower one third of said zone and contacting said alcohol with a fluidized bed of active iron mill scale catalyst which has been ground and reduced whereby a conversion to the respective carbonyl compound is secured simultaneously with the formation of hydrocarbons.

7. The process of claim 6 in which the alcohol employed is a primary alcohol.

8. The process of claim 6 in which the alcohol employed is a secondary alcohol.

9. In a method for altering the composition of a stream of oxygenated organic chemicals, produced during the synthesis of hydrocarbons, in a generally vertically positioned reaction zone wherein synthesis gas composed chiefly of carbon monoxide and hydrogen is passed upwardly through said zone and is partially converted to hydrocarbons and said chemicals under known synthesis conditions, the steps which comprise introducing into said reaction zone only at a point above the lower one third of said zone one of a class of compounds selected from the group consisting of carbonyl and alcohol compounds and contacting said one of a class of compounds of carbonyl and alcohol compounds with an active iron hydrocarbon synthesis catalyst substantially free from silica whereby a conversion to the other of said class of compounds is secured simultaneously with the formation of hydrocarbons.

CLIFTON G. FRYE.

References Cited in the file of this patent

UNITED STATES PATENTS

| Number | Name | Date |
| --- | --- | --- |
| 2,247,087 | Herbert | June 24, 1941 |
| 2,448,279 | Rubin | Aug. 31, 1948 |
| 2,474,845 | Jenny et al. | July 5, 1949 |
| 2,485,945 | Walker | Oct. 25, 1949 |
| 2,486,633 | Clark | Nov. 1, 1949 |